United States Patent [19]
Ebner et al.

[11] 4,065,550
[45] Dec. 27, 1977

[54] PROCESS FOR PREPARING LITHIUM HEXAFLUOROARSENATE OF HIGH PURITY

[75] Inventors: Walter B. Ebner, Hartsville; Charles Richard Walk, Collegeville, both of Pa.

[73] Assignee: The United States of America as represented by the Secretary of the Army, Washington, D.C.

[21] Appl. No.: 764,490

[22] Filed: Jan. 31, 1977

[51] Int. Cl.$^2$ .................... C01B 27/02; C01D 15/00; C01B 11/18
[52] U.S. Cl. .................................... 423/464; 423/476
[58] Field of Search ..................... 423/464, 476, 463

[56] References Cited

U.S. PATENT DOCUMENTS

| | | | |
|---|---|---|---|
| 3,654,330 | 4/1972 | Wiesboeck | 423/301 X |
| 3,655,332 | 4/1972 | Smith, Jr. | 423/464 |
| 3,907,977 | 9/1975 | Wiesboeck | 423/464 |
| 3,925,539 | 12/1975 | Meshri et al. | 423/464 |

FOREIGN PATENT DOCUMENTS

| | | | |
|---|---|---|---|
| 1,439,907 | 6/1976 | United Kingdom | 423/464 |

*Primary Examiner*—Edward Stern
*Attorney, Agent, or Firm*—Nathan Edelberg; A. Victor Erkkila; Harold H. Card, Jr.

[57] ABSTRACT

Lithium hexafluoroarsenate of high purity is prepared by a metathetical reaction between potassium hexafluoroarsenate and lithium perchlorate in an inert organic solvent such as methyl formate. The potassium perchlorate produced is insoluble in the solvent and can be readily separated from the lithium hexafluoroarsenate which is soluble in the solvent.

4 Claims, No Drawings

PROCESS FOR PREPARING LITHIUM HEXAFLUOROARSENATE OF HIGH PURITY

GOVERNMENTAL INTEREST

The invention described herein was made in the course of a contract with the Government.

BACKGROUND OF THE INVENTION

This invention relates to a process for preparing lithium hexafluoroarsenate, which has recently found use as an electrolyte in high-energy density batteries.

U.S. Pat. No. 3,655,332 (see also Honeywell, Inc. Contract NAS 3-10613, Final Report for the period May 31, 1967, to Apr. 30, 1968; Report NASA CR72535, National Aeronautics and Space Administration, Office of Scientific and Technical Information) discloses a process for producing lithium hexafluoroarsenate by a metathetical reaction in an inert organic solvent between lithium tetrafluoroborate and an alkali metal hexafluoroarsenate. The product thus obtained from commercially available lithium tetrafluoroborate is impure and unsatisfactory for use as an electrolyte in long life lithium batteries. This is due to the impurities in commercially available lithium tetrafluoroborate and as yet no satisfactory method for its purification has been developed. Lithium hexafluoroarsenate has also been prepared by (1) neutralization of hexafluoroarsenic acid ($HAsF_6$) with LiOH, (2) reaction of LiF and $AsF_5$ in an organic solvent, (3) reaction of LiF, $As_2O_5$ and HF in water and fluorination of the $LiAsF_5OH$ produced with HF, and (4) neutralization of $As_2O_5$ with aqueous LiOH, hydrolysis of the $LiH_2AsO_4$ produced to $LiAsF_5OH$ and fluorination of the latter with HF. The products obtained by these methods are contaminated with HF and possibly lithium hydroxyfluoro compounds such as $LiAsF_5OH$, which make them unsuitable for use in long life lithium batteries.

Lithium hexafluoroarsenate of high purity suitable for use as electrolyte in long life lithium batteries can be obtained according to the process described in U.S. Pat. No. 3,654,330, which comprises reacting $LiAsF_6$ with excess $CH_3CN$ to form $Li(CH_3CN)_4AsF_6$, filtering the solution to remove impurities, cooling to precipitate the product and thermally decomposing the product to remove the $CH_3CN$ and leave a residue of $LiAsF_6$. However, the process requires $LiAsF_6$ as starting material and is relatively expensive.

SUMMARY AND DETAILED DESCRIPTION OF THE INVENTION

In accordance with this invention lithium hexafluoroarsenate of high purity is obtained by a novel process which comprises metathetically reacting lithium perchlorate and potassium hexafluoroarsenate dissolved in a carboxylic acid ester of the formula $RCOOR_1$, wherein R is hydrogen or an alkyl radical of 1 to 4 carbon atoms and $R_1$ is an alkyl radical of 1 to 4 carbon atoms. The lithium hexafluoroarsenate thus formed is soluble in the carboxylic acid ester solvent, whereas the potassium perchlorate produced is essentially insoluble therein and hence can be readily separated. The reaction is represented by the following equation:

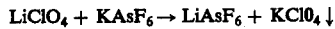

$$LiClO_4 + KAsF_6 \rightarrow LiAsF_6 + KClO_4 \downarrow$$

Sodium hexafluoroarsenate cannot be employed in similar manner, since the sodium perchlorate formed is appreciably soluble in the solvent and hence cannot be separated from the lithium hexafluoroarsenate (for example, sodium perchlorate is soluble in methyl formate to a concentration of approximately 5 moles per liter at ordinary temperature).

The present process is advantageous not only in that it can produce lithium hexafluoroarsenate in high purity and yield but also since it requires no special equipment and utilizes reactants which are available commercially in high purity at relatively low cost. By the term high purity is meant that the product contains at least 99.5% lithium hexafluoroarsenate and less than 250 ppm. moisture.

The process of the present invention comprises mixing together the lithium perchlorate and the potassium hexafluoroarsenate in the aforesaid carboxylic ester solvent at temperatures up to about 70° C. The potassium hexafluoroarsenate possesses good solubility in the ester solvent. The lithium perchlorate, which is less soluble in the solvent, may be present as a slurry or complete solution in the reaction mixture depending on the amount of particular solvent employed. When a slurry is employed, the solid lithium perchlorate gradually passes into solution as the dissolved salt reacts with the dissolved potassium hexafluoroarsenate to form lithium hexafluoroarsenate. The lithium hexafluoroarsenate formed is soluble in the solvent while the by-product potassium perchlorate is insoluble in the resulting solvent medium, whereby the metathetical reaction proceeds essentially to completion. The ratio of solvent to reactants employed should be sufficient to dissolve the lithium hexafluorarsenate product but insufficient to dissolve a significant amount of the potassium perchlorate produced as a by-product of the reaction. The precipitated potassium perchlorate can be separated by filtration or in other suitable manner. The lithium hexafluoroarsenate can be recovered in solid form from the resulting solution by removal of the solvent by vacuum distillation in known manner.

As shown in the foregoing equation, the present process is effected by reacting equimolecular proporations of lithium perchlorate and potassium hexafluoroarsenate. Since potassium salts have been found to be detrimental to certain $LiAsF_6$-methyl formate electrolytes, a slight excess, up to about 1 to 2%, of lithium perchlorate can be employed to insure that all of the potassium hexafluoroarsenate is reacted and precipitated as potassium perchlorate. This can result in a $LiAsF_6$ product containing a small amount of $LiClO_4$. However, the presence of such small amounts of $LiClO_4$ would be compatible, since $LiClO_4$ is utilized as an electrolyte salt in many lithium battery applications. The time required for the completion of the metathetical reaction is not critical. As shown in the example, the reaction can be completed in about 2 hours, although a shorter or longer period can be employed as appropriate.

The present process is carried out at temperatures within the range of about −20° to 70° C., and preferably at a temperature between 0° and 35° C. Further, it is preferred to carry out the reaction in an inert atmosphere essentially free from water vapor to minimize the harmful effects of water generally associated with lithium salts.

Carboxylic acid ester solvents which are suitable for use in the present process include methyl formate, ethyl formate, methyl acetate, ethyl acetate, butyl acetate, methyl propionate, ethyl propionate, ethyl butyrate and butyl butyrate. The preferred solvent is methyl formate.

The following example illustrates a specific embodiment of the method of carrying out the process of the present invention. The parts in the example are parts by weight.

EXAMPLE 1.00 part $LiClO_4$
2.12 parts $KAsF_6$ were charged to a dry glass bottle*. The bottle containing these salts and a glass bottle containing methyl formate were placed in a desiccator. The desiccator was then evacuated to remove the air and to saturate the atmosphere therein with methyl formate vapor and then sealed and allowed to stand for 16 hours. The bottles were then removed and the methyl formate was added to the bottle containing the salt mixture until a ratio of 4.11 parts of methyl formate per part of lithium perchlorate was present. The bottle was then sealed and agitated at room temperature for about 2 hours. The reaction mixture was then filtered to remove the precipitate of $KClO_4$ and the filtrate was transferred to a round bottom glass flask and vacuum distilled until a dry solid product was obtained. The $LiAsF_6$ product was then ground to a fine powder and dried further under a vacuum at room temperature for 16 hours. Alternatively, the $LiAsF_6$ solution in methyl formate obtained as filtrate can be employed directly for the preparation of electrolyte for lithium batteries. 16 *All materials were handled and processed at ambient temperature in an atmosphere having a relative humidity of less than three percent. The methyl formate, $KAsF_6$ and $LiClO_4$ employed were obtained from commercial sources as follows:

1. methyl formate (spectroquality grade), Matheson Coleman & Bell, Manufacturing Chemists, Norwood Ohio;
2. potassium hexafluoroarsenate (high purity grade), Ozark-Mahoning Company, Special Chemicals Division, Tulson, Okla.; and
3. lithium perchlorate (reagent grade, anhydrous) G. Frederick Smith Chemical Co., Columbus, Ohio.

The methyl formate contained less than 150 ppm. total impurities (water, methanol, dimethyl ether and formic acid). The $KAsF_6$ was recrystallized from water. The $KAsF_6$ and $LiClO_4$ were ground and dried and contained 200 ppm. and 500 ppm. moisture, resp. (ASTM E203-64 Karl Fischer method).

The foregoing disclosure is merely illustrative of the principles of this invention and are not to be interpreted in a limiting sense. I wish it to be understood that I do not desire to be limited to the exact details of construction shown and described, because obvious modification will occur to a person skilled in the art.

We claim:

1. A process for producing lithium hexafluoroarsenate which comprises reacting approximately equimolecular proportions of lithium perchlorate and potassium hexafluoroarsenate in an inert organic solvent consisting essentially of a carboxylic acid ester of the formula $RCOOR_1$, wherein R is hydrogen or an alkyl radical of 1 to 4 carbon atoms and $R_1$ is an alkyl radical of 1 to 4 carbon atoms at a temperature up to about 70° C. in an inert atmosphere essentially free from water vapor, and recovering the lithium hexafluoroarsenate produced.

2. The process of claim 1, wherein the carboxylic acid ester is methyl formate.

3. The process of claim 1, wherein the reaction is carried out at a temperature within the range of 0° and 35° C.

4. The process of claim 1, wherein the lithium hexafluoroarsenate is recovered from solution in the solvent by separating therefrom the insoluble potassium perchlorate produced as a by product and removing the solvent by distillation.

* * * * *